(12) United States Patent
Krumböck

(10) Patent No.: US 7,371,062 B2
(45) Date of Patent: May 13, 2008

(54) DEVICE FOR CALIBRATING AN EXTRUDED PLASTIC PROFILE

(75) Inventor: Erwin Krumböck, Ansfelden (AT)

(73) Assignee: Gruber & Co.Group GmbH, Kremsmünster (AT)

( * ) Notice: Subject to any disclaimer, the term of this patent is extended or adjusted under 35 U.S.C. 154(b) by 0 days.

(21) Appl. No.: 10/553,485

(22) PCT Filed: Apr. 14, 2004

(86) PCT No.: PCT/AT2004/000129

§ 371 (c)(1),
(2), (4) Date: Oct. 17, 2005

(87) PCT Pub. No.: WO2004/091890

PCT Pub. Date: Oct. 28, 2004

(65) Prior Publication Data

US 2006/0134257 A1    Jun. 22, 2006

(30) Foreign Application Priority Data

Apr. 15, 2003   (AT) ............................... A 576/2003

(51) Int. Cl.
B29C 47/90    (2006.01)
(52) U.S. Cl. ............... 425/326.1; 425/185; 425/192 R; 425/388
(58) Field of Classification Search .......... 425/71, 425/326.1, 384, 388, 185, 190, 192 R
See application file for complete search history.

(56) References Cited

U.S. PATENT DOCUMENTS

| | | | |
|---|---|---|---|
| 4,288,905 A | 9/1981 | Kessler | |
| 5,316,459 A | 5/1994 | Melkonian et al. | |
| 6,200,119 B1 | 3/2001 | Pelto et al. | |
| 6,287,102 B1* | 9/2001 | Franz et al. | 425/71 |
| 6,296,464 B1* | 10/2001 | Purstinger | 425/72.1 |
| 6,394,782 B1 | 5/2002 | Grassi | |
| 2001/0018078 A1* | 8/2001 | Kossl | 425/71 |
| 2003/0012834 A1* | 1/2003 | Kossl | 425/71 |

FOREIGN PATENT DOCUMENTS

| | | |
|---|---|---|
| DE | 1201038 | 9/1965 |
| DE | 2809386 | 9/1979 |

OTHER PUBLICATIONS

International Search Report of PCT/AT2004/00129, Feb. 2, 2006.

* cited by examiner

Primary Examiner—Robert B. Davis
Assistant Examiner—Joseph Leyson
(74) Attorney, Agent, or Firm—Collard & Roe, P.C.

(57) ABSTRACT

A device for calibrating an extruder plastic profile having a calibration unit for the profiled strand coming-out of a molding profile nozzle is described, the calibration unit having a molding body (1) enclosing the profiled strand, having calibration surfaces (5), which press against the profiled strand, and vacuum slots (6), which run in the calibration surfaces (5) transversely to the passage direction of the profiled strand (2) and are connectable to a partial vacuum source. In order to provide advantageous construction conditions, it is suggested that at least individual vacuum slots (6) penetrate the molding body (1) transversely to the passage direction (2) and be closed on outside of the molding body (1) using a removable cover (12).

13 Claims, 7 Drawing Sheets

US 7,371,062 B2

DEVICE FOR CALIBRATING AN EXTRUDED PLASTIC PROFILE

CROSS REFERENCE TO RELATED APPLICATIONS

Applicant claims priority under 35 U.S.C. §119 of Austrian Application No. A 576/2003 filed Apr. 15, 2003. Applicant also claims priority under 35 U.S.C. §365 of PCT/AT2004/000129 filed Apr. 14, 2004. The international application under PCT article 21(2) was not published in English.

FIELD OF THE INVENTION

The present invention relates to a device for calibrating an extruded plastic profile having a calibration unit for the profiled strand coming out of a molding profile nozzle, the calibration unit having a molding body enclosing the profiled strand having calibration surfaces, which press against the profiled strand, and vacuum slots, which run in the calibration surfaces transversely to the passage direction of the profiled strand and are connectable to a partial vacuum source.

DESCRIPTION OF THE PRIOR ART

To extruded a plastic profile, the hot profiled strand coming out of a molding profile nozzle is calibrated and cooled, and first dried in a calibration device, before the profiled strand is guided through a cooling tank filled with a cooling liquid, generally water, for further cooling. This calibration device has a calibration unit having a molding body which is provided with calibration surfaces tailored to the cross-sectional shape of the plastic profile, with vacuum slots, running in the calibration surfaces transversely to the passage direction of the profiled strand and connected to a partial vacuum source, ensuring that the plastic profile presses against the calibration surfaces of the molding body. For simple manufacture of such calibration units, constructing the molding body from individual parts running in the passage direction of the profiled strand, which are screwed together, is known (DE 28 09 386A1).

In order that the hot profiled strand coming out of the profile nozzle may be cooled appropriately, cooling ducts are drilled into the calibration unit, through which a coolant, preferably water, is pumped. Since the cooling ducts are provided as close as possible to the calibration surfaces for better cooling of the profiled strand and run in the passage direction of the profiled strand, the space provided for positioning vacuum slots is restricted, so that the vacuum slots have only a comparatively low depth. Because of this low depth and the functionally required restriction of the opening width, the vacuum slots must be connected to partial vacuum ducts at multiple points at a high manufacturing cost, in order to be able to build up the partial vacuum necessary for suctioning the profiled strand against the calibration surfaces in the area of the vacuum slots.

Before the cooling of the profiled strand coming out of the profile nozzle, exudations from the plastic on the strand surface are to be expected, which result in deposits in the area of the vacuum slots above all, particularly in an intake section of the calibration unit. These deposits narrow the flow cross-section of the vacuum slots, which may no longer fulfill their object as these deposits grow. This means that the vacuum slots must be cleaned regularly, which is complex because the vacuum slots are only accessible from the calibration surfaces, so that the production of the plastic profile must be interrupted and the calibration unit must be opened.

SUMMARY OF THE INVENTION

The present invention is thus based on the object of implementing the construction of a device for calibrating an extruded plastic profile of the type described at the beginning in such a way that not only may the required partial vacuum be advantageously built up in the vacuum slots, but rather also cleaning of the vacuum slots is made possible without interrupting the production.

The present invention achieves the stated object in that at least individual vacuum slots penetrate the molding body transversely to the passage direction and are closed on the outside of the molding body using a removable cover.

Since the vacuum slots penetrate the molding body transversely to the passage direction of the profiled strand, the vacuum slots are externally accessible after removing the cover, which makes it possible to clean the vacuum slots without disassembling the calibration unit, even during the passage of a profiled strand. The vacuum slots may penetrate the molding body transversely to the passage direction of the profiled strand and transversely to the longitudinal direction of their discharge opening lying in the calibration surfaces, which opens up an advantageous access to the discharge openings for cleaning purposes. The vacuum slots extending transversely to the longitudinal direction of their discharge openings through the molding body additionally allow their connection to generously dimensioned partial vacuum ducts, which run in the passage direction, so that a more uniform partial vacuum may be built up over the entire slot length. The vacuum slots penetrating the molding body transversely to the longitudinal direction of their discharge opening require a more complex guiding of the cooling ducts, however, which are known to be provided between the vacuum slots, which are positioned one after another at intervals in the passage direction.

Since the profiled strand from the profile nozzle is to be suctioned against the calibration surfaces as early as possible in the intake area of the calibration unit in order to achieve good surface quality of the plastic profile, vacuum slots are to be positioned near the intake-side front face of the molding body of the calibration unit. However, vacuum slots provided in this intake-side area, which penetrate the molding body transversely to the longitudinal direction of their discharge openings, suppress cooling of the intake-side front face of the molding body by the adjoining, cooled molding body section. Since separate cooling of the intake-side front face of the molding body may hardly be constructively performed due to the tight space conditions, vacuum slots which penetrate the molding body transversely to the longitudinal direction of their discharge openings are forbidden in this area. In order to nonetheless allow cleaning of these front vacuum slots, the vacuum slots may penetrate the molding body in the longitudinal direction of their discharge opening. The vacuum slots penetrating the molding body in their longitudinal direction may be externally cleaned without interrupting the cooling of the intake-side front face by the adjoining cooled section. The particular construction requirements may thus be advantageously fulfilled using vacuum slots which penetrate the molding body in its longitudinal direction or transversely thereto.

In order to ensure a uniform partial vacuum over the discharge opening of the vacuum slots, the vacuum slots may be expanded transversely to the slot width adjoining their discharge opening. This is particularly true for vacuum slots which penetrate the profiled strand in the longitudinal direction of their discharge opening. For vacuum slots penetrating the molding body transversely to the longitudinal direction of their discharge opening, a guide shoulder is provided in the area of the expansion for a cleaning tool, which extends either over the length of the vacuum slots or has a shorter length than the vacuum slots and is displaceable along the guide shoulder. The guide shoulder constructively determines a predefined distance to the particular calibration surface, so that with appropriate dimensioning of the cleaning tool, the tool interacts with the guide shoulder using a guide extension without endangering the strand surface.

The manufacturing of the vacuum slots in the molding body may be designed easily if the molding body is subdivided into longitudinal sections transversely to the passage direction, which are formed between the vacuum slots. In this case, it is recommended that the vacuum slots be implemented through depressions in the front face of one of two abutting longitudinal sections, the adjoining front face of the other section covering the depression, so that only one of the two front faces of a longitudinal section of the molding body has to be machined to implement the vacuum slots. The subdivision of the molding body into longitudinal sections provides the additional advantage that the calibration surfaces in the individual longitudinal sections of the molding body may be designed differently in order to be able to adapt the calibration unit at the intake side to the nozzle and at the outlet side to a following calibrator. The calibration surfaces in the intake-side longitudinal section run slightly conically in the passage direction of the profiled strand in order to press the calibration surfaces of the calibration unit against the profiled strand coming out of the profile nozzle uniformly over the circumference. A conical expansion of the calibration surfaces of the outlet-side longitudinal section may help to compensate for alignment and angle errors of a following calibrator.

As already noted, because of the vacuum slots penetrating the molding body transversely to the longitudinal direction of its discharge opening, continuous cooling ducts in the passage direction are not possible. In order to nonetheless ensure good heat dissipation over the calibration surfaces, the longitudinal sections may have through holes, which run in the passage direction and are closed on both sides, in the area of the calibration surfaces to form cooling ducts, which are connected via connection holes to shared inlet and outlet holes penetrating the longitudinal sections in the passage direction outside areas of the vacuum slots. Through these measures, the cooling ducts may be drilled with their connections into the longitudinal sections without anything further and have the coolant applied to them via the shared intake and outlet holes.

The cover of the vacuum slots on the outside of the molding body may have different constructive designs, because its only purpose is to close the vacuum slots airtight. Especially simple construction conditions result, however, if the cover of the vacuum slots comprises a flexible film on the outside of the molding body, which is suctioned against the outside of the molding body to form a seal via the partial vacuum existing in the area of the vacuum slots. In order that all vacuum slots around a circumference of the molding body do not have to be opened simultaneously during use of such a film, a film extending over multiple vacuum slots around a circumference of the molding body may be used as a cover, which has notches originating from an edge and extending between the vacuum slots, so that the tongues of the film resulting between the notches may each be lifted from the associated vacuum slot individually, which allows cleaning of the individual vacuum slots one after another.

In order to ensure the film is held on the outside of the molding body even after the partial vacuum source is turned off, the film of the cover may be magnetic in at least some areas. No special requirements are placed on this holding, because the pressing of the film against the edges of the vacuum slots to form a seal is not achieved by the magnetic forces, but rather by the partial vacuum in the vacuum slots.

BRIEF DESCRIPTION OF THE DRAWINGS

The object of the present invention is illustrated for exemplary purposes in the drawing.

DESCRIPTION OF THE PREFERRED EMBODIMENTS

Figure 6:
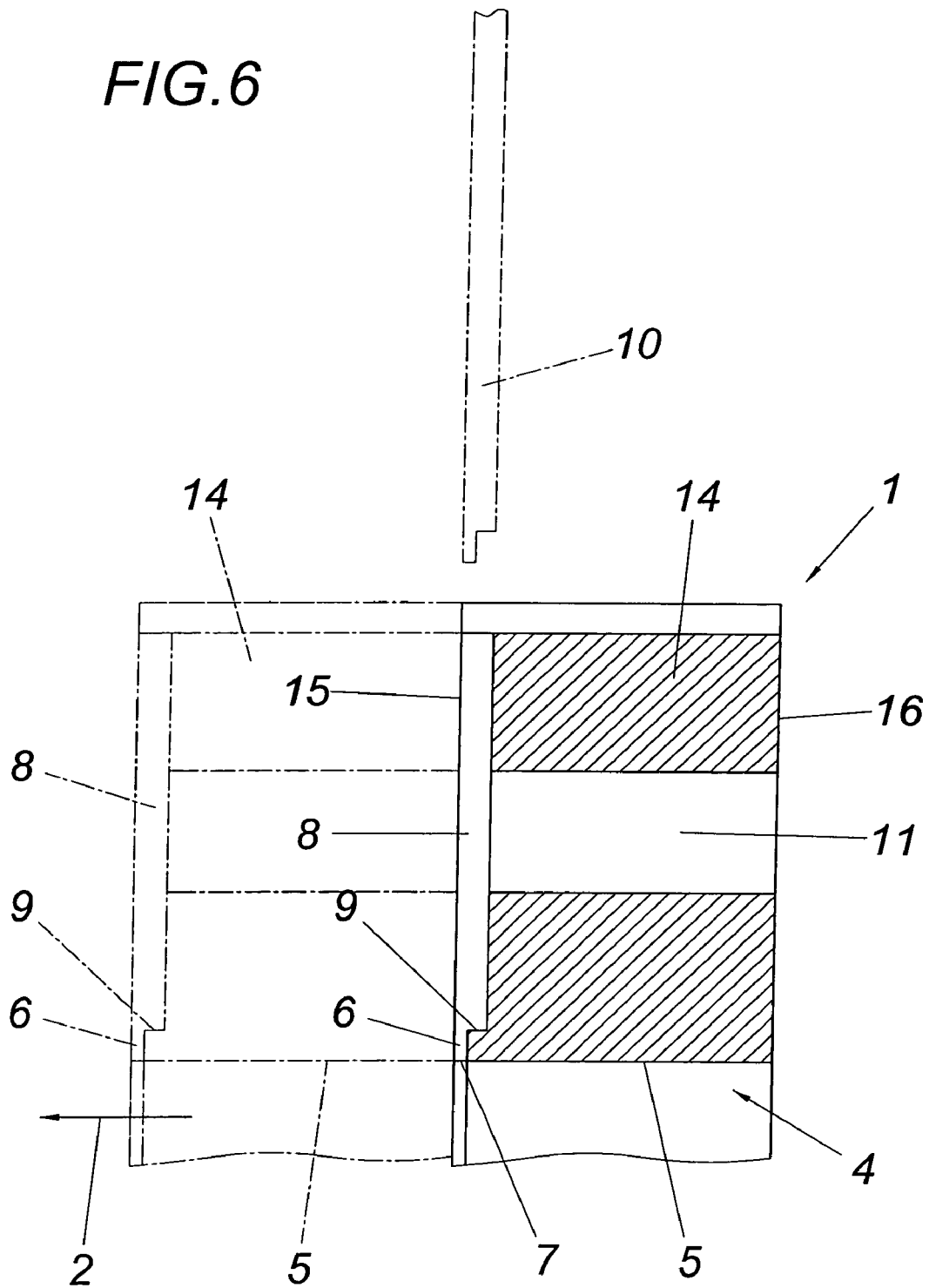
FIG. 6 shows a section along the line VI-VI of FIG. 5 in a larger scale.

The calibration unit has a molding body 1, which is positioned directly after a molding profile nozzle of an extruding tool and is attached to a support plate 3 on the outlet side in relation to the passage direction 2 of the profiled strand coming out of the profile nozzle. The passage opening 4 for the profiled strand is delimited by calibration surfaces 5, which the profiled strand is suctioned against. For this purpose, vacuum slots 6 running transversely to the passage direction 2 are provided in the calibration surfaces 5, which are positioned at mutual intervals in passage direction 2. In contrast to typical calibration units, the vacuum slots penetrate the molding body 1 transversely to the passage direction 2, however, and transversely to the longitudinal direction of their discharge openings 7 lying in the calibration surfaces 5, as shown in FIGS. 1 through 6. The vacuum slots 6 have an expansion 8 transversely to the slot width adjoining their discharge openings 7, as shown in FIG. 6 in particular. Through the expansion 8, not only are the flow conditions for suctioning the profiled strand against the calibration surfaces 5 improved and the danger in regard to closing the vacuum slots through deposits reduced, but rather also a guide shoulder 9 is achieved, which runs at a predefined distance to the associated calibration surfaces 5 and may be used as a support for a cleaning tool 10, which is inserted externally through the particular vacuum slot 6 until it stops on the guide shoulder 9 in order to shear off deposits in the area of the discharge opening 7 and press them against the profiled strand, using which the sheared deposits may be carried out of the calibration unit. The calibration unit is therefore to be left open in the area of the vacuum slots 6, in order to be able to insert the cleaning tool 10 into the vacuum slots externally. For this purpose, the molding body 1 may be held at a distance above a calibration table by the support plate 3. The cleaning tool 10 itself may have a cross-section corresponding to the cross-section of the discharge opening 7 and therefore extend over the entire length of the vacuum slot 6 or be moved along the guide shoulder 9 over the slot length.

The vacuum slots 6 are connected via generously dimensioned vacuum ducts 11 to a partial vacuum source, and via the support plate 3. In order to be able to build up in appropriate partial vacuum for suctioning the profiled strand against the calibration surfaces 5 within the vacuum slots 6, the vacuum slots 6 must be closed on the outside of the molding body 1. For this purpose, a removable cover 12 is provided, which preferably is made of a flexible film and is suctioned against the molding body 1 to form a seal by the partial vacuum built up in the vacuum slots 6. In order to be able to open the vacuum slots individually, the film of the cover 12 is provided with notches 13, which originate from an edge and extend between the vacuum slots 6, so that the tongues formed by the notches 13, which each cover a vacuum slot, may be lifted individually from the molding body 1.

For simple manufacturing of the vacuum slots 6, the molding body 1 is subdivided into longitudinal sections 14 transversely to the passage direction 2, between which the vacuum slots 6 are provided. They are positioned in this case so that the plate-shaped longitudinal sections 14 have depressions forming the vacuum slots 6 on a front face 15, preferably the one on the outlet side, but are implemented as flat on the diametrically opposite front face 16, preferably on the intake side, so that when the plate-shaped longitudinal sections 14 are clamped together axially, the vacuum slots 6 are obtained. With the exception of the intake-side longitudinal section 14, the longitudinal sections 14 have through holes running parallel to the passage direction 2 to form the partial vacuum ducts 11, as shown particularly by FIG. 4.

Figure 1:
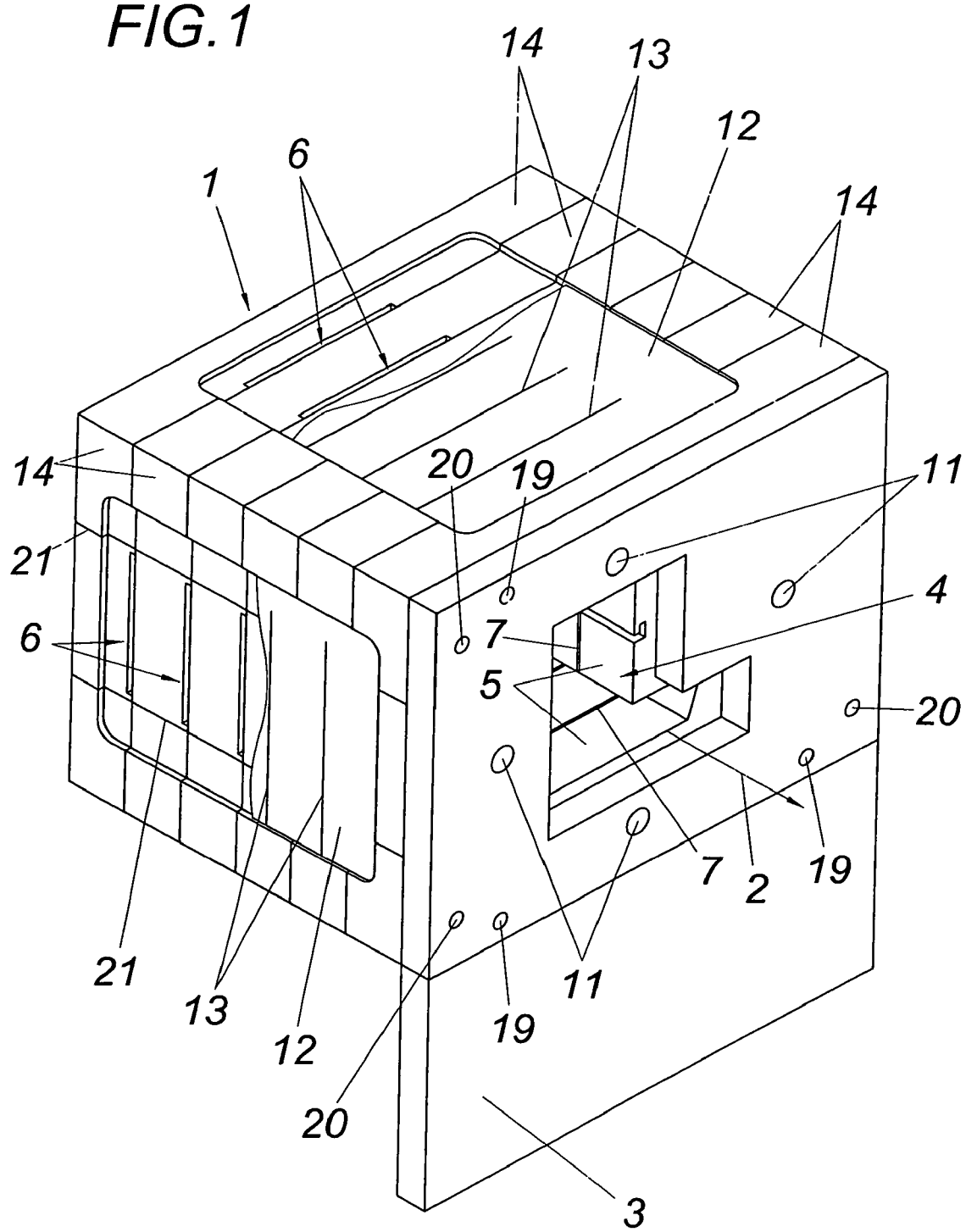
FIG. 1 shows a calibration unit according to the present invention in a simplified diagram.
Figure 2:
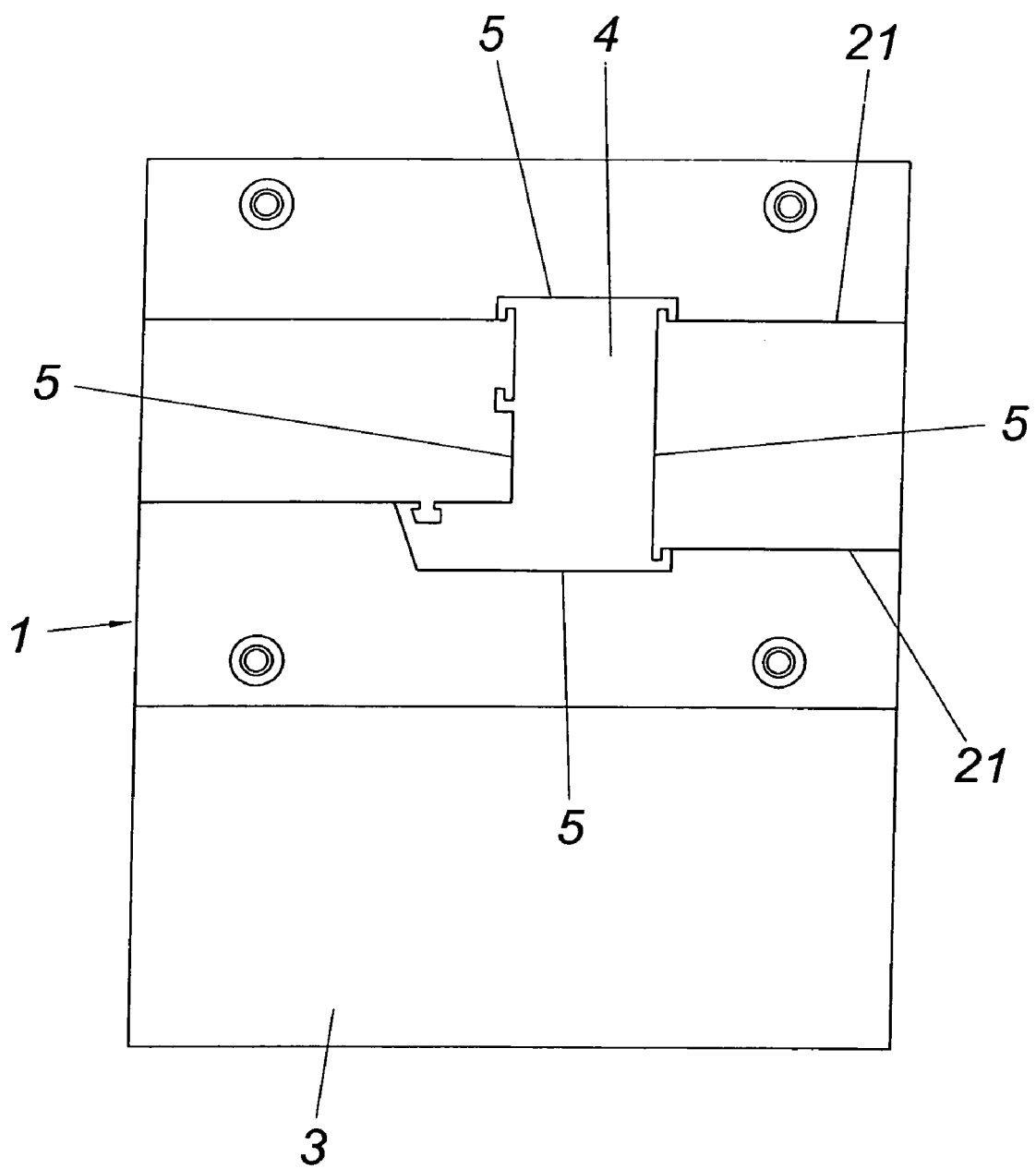
FIG. 2 shows this calibration device in a view of the intake-side front face.
Figure 3:
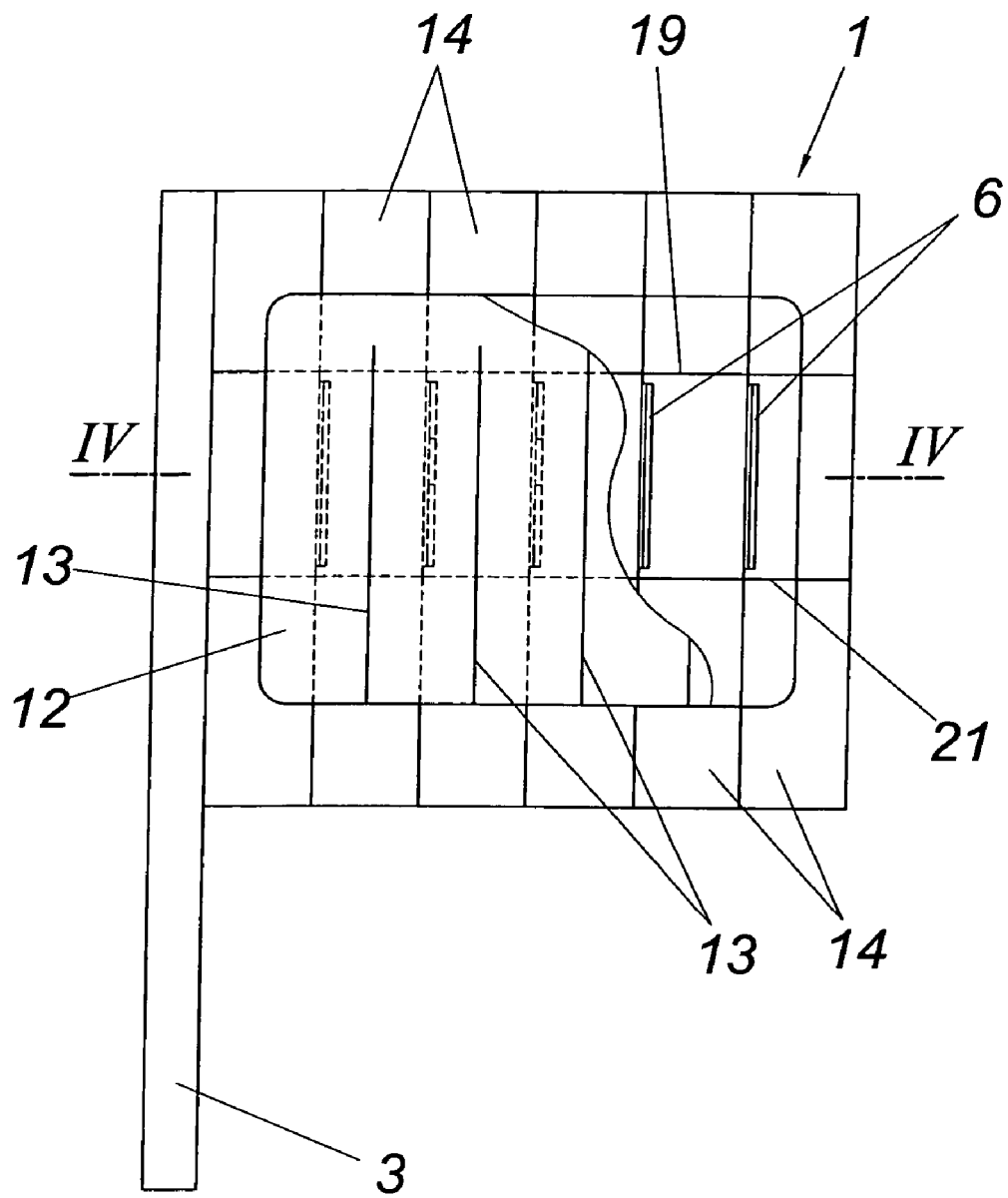
FIG. 3 shows the calibration device in a side view.
Figure 4:
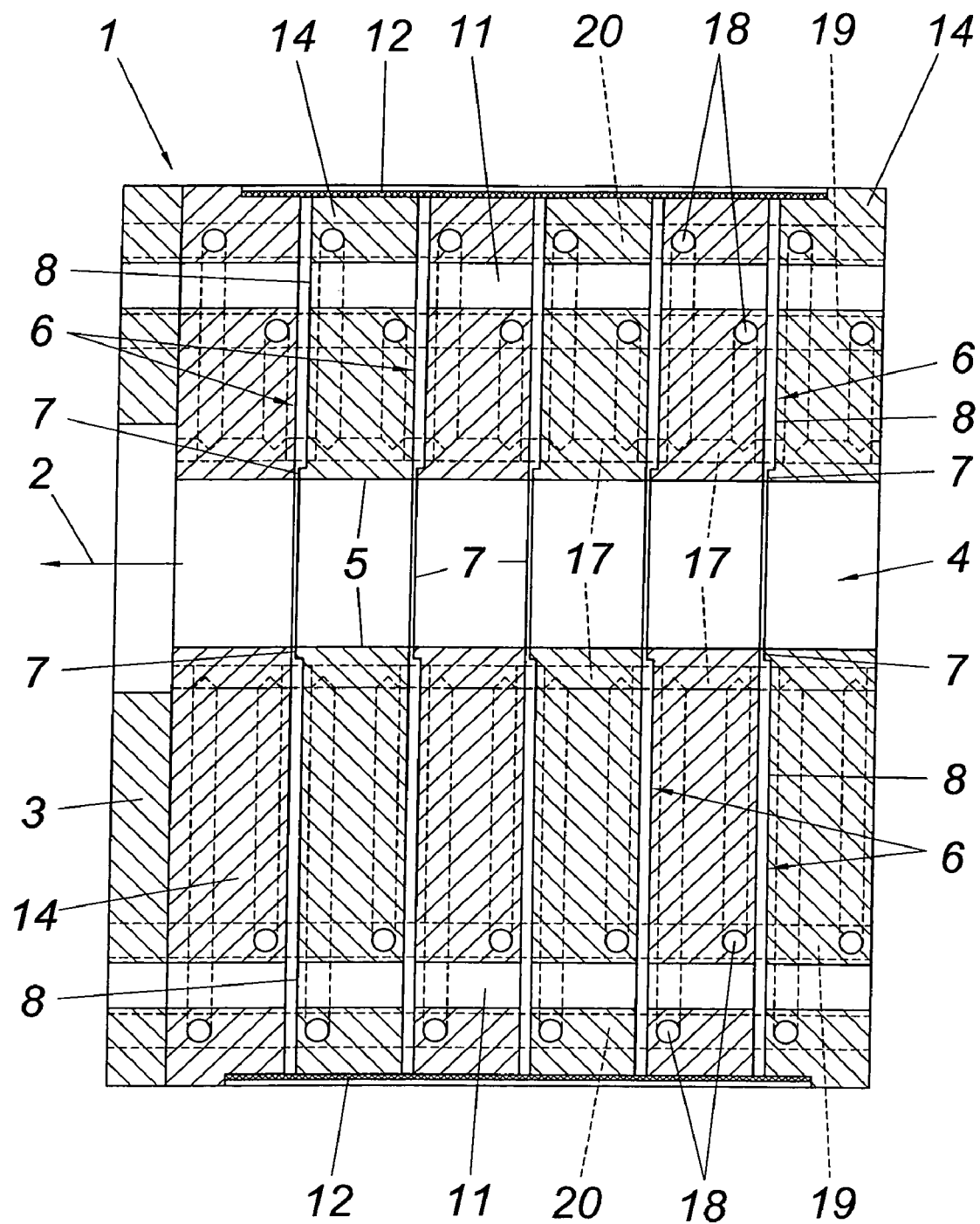
FIG. 4 shows a section along the line IV-IV of FIG. 3 in a larger scale.
Figure 5:
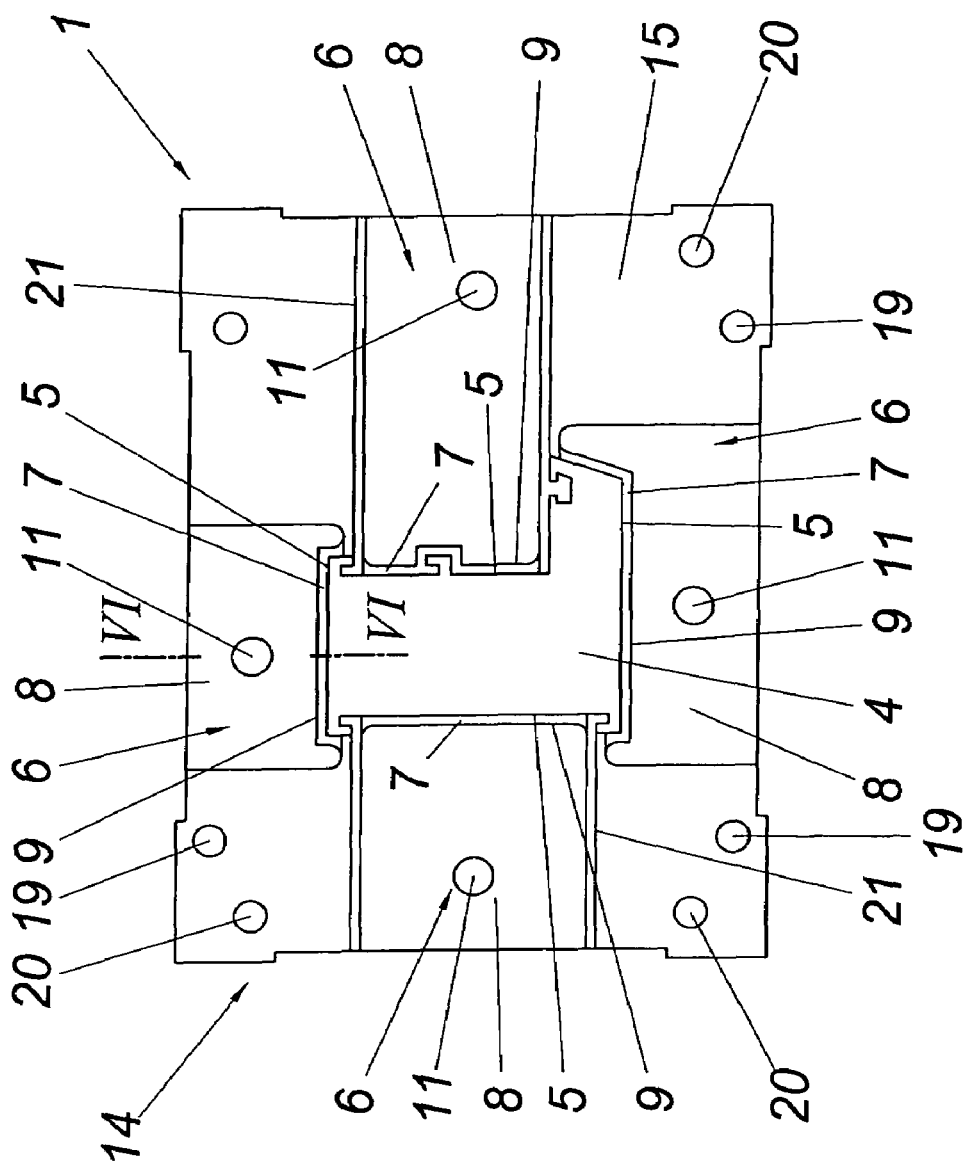
FIG. 5 shows a front view of a longitudinal section of the molding body having the depressions for the vacuum slots.

The vacuum slots 6 running transversely to the passage direction 2, which penetrate the molding body 1 transversely to the longitudinal direction of their discharge openings 7, obstruct the typical continuous guiding of the cooling ducts 17 to be provided in the passage direction 2, whose positioning must therefore be restricted to the individual longitudinal sections 14. As shown in FIG. 4, the cooling ducts 17 are connected via connection holes 18 to intake and/or outlet holes 19, 20 for the coolant, which penetrate the longitudinal sections 14 in the passage direction 2 outside the areas of the vacuum slots 6, as may be seen from FIG. 5. These shared intake and outlet holes 19, 20 for the cooling ducts 17 of the individual longitudinal sections 14 are preferably fed via the support plate 3.

The molding body 1 is not only subdivided into longitudinal sections 14, but rather also transversely thereto through partition surfaces 21, which run in passage direction 2, in order to be able to assemble the profile cross-section determined by the calibration surfaces 5 in a typical way from individual molding strips along the partition surfaces 21.

Figure 7:
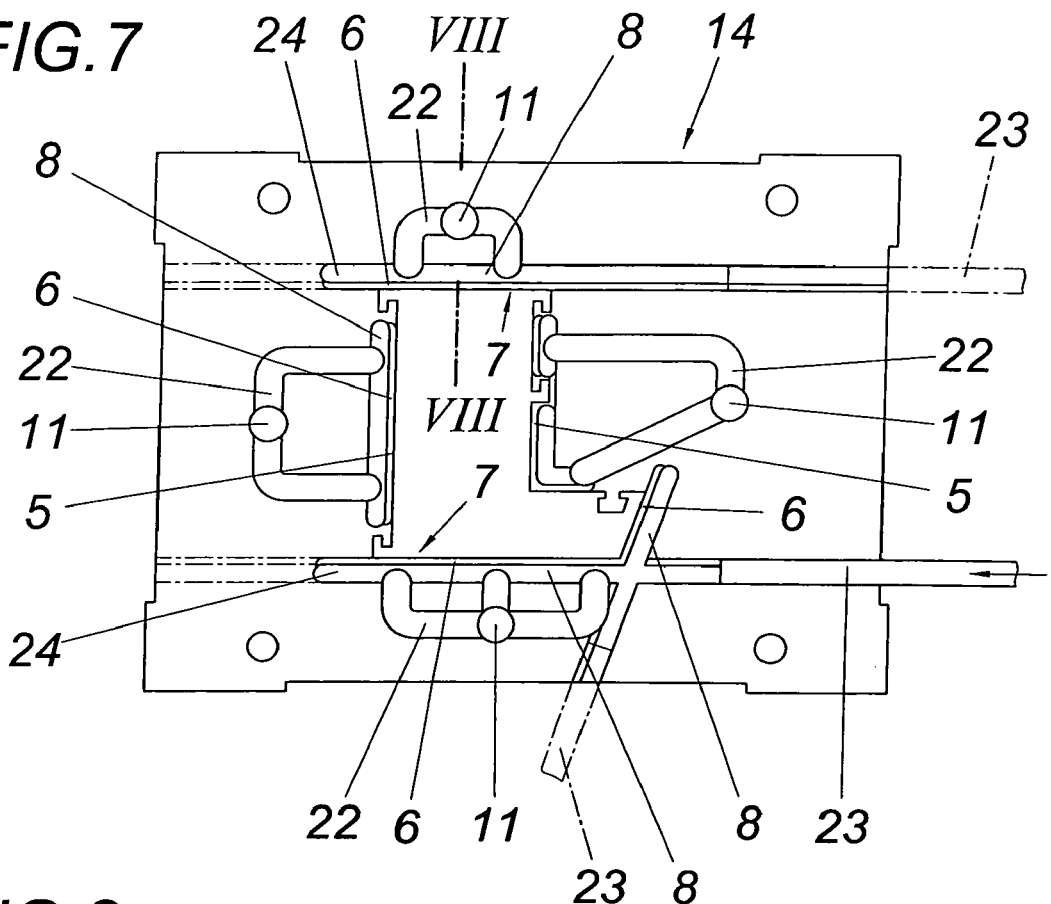
FIG. 7 shows an illustration of a construction variation of the front longitudinal section of the molding body corresponding to FIG. 5.
Figure 8:
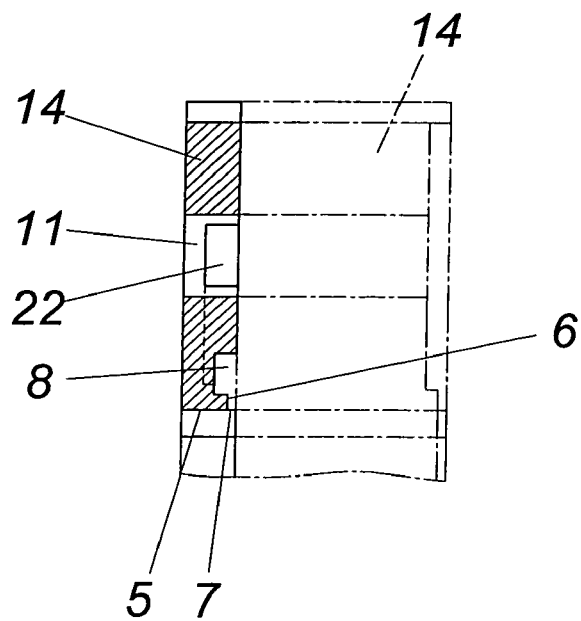
FIG. 8 shows a section along the line VIII-VIII of FIG. 7 in a larger scale.

An embodiment variation of the front longitudinal section 14 on the intake side of the molding body 1 is illustrated in FIG. 7 and FIG. 8. In contrast to the embodiment of FIGS. 1 through 6, the vacuum slots 6 do not penetrate the molding body 1 transversely to the longitudinal direction, but rather in the longitudinal direction of their discharge openings 7. This means that the vacuum slots 6, which in turn are to have an expansion 8 transverse to the slot width adjoining their discharge opening 7, continue on at least one side up to the external surface of the molding body 1 and are closed in the surface area by a removable cover in order to be able to build up an appropriate partial vacuum in the area of the vacuum slots 6. The vacuum slots 6 are connected via the expansions 8 and connection channels 22 to the vacuum ducts 11. With the cover open, cleaning tools 23 may be inserted into longitudinal direction of the vacuum slots 6 to clean the vacuum slots 6, as shown in FIG. 7. These cleaning tools 23 have a cross-section which corresponds to the cross-section of the vacuum slots 6 and the adjoining expansion 8, so that deposits in the area of the vacuum slots 6 may be sheared off and carried out with the profiled strand. Remaining deposits may additionally be pushed into extensions 24 of the vacuum slots if the vacuum slots do not penetrate the molding body on both sides, as is indicated with a dot-dash line in FIG. 7.

Because of the extension of the vacuum slots 6 with their expansions 8 up to the surface of the molding body 1, the front longitudinal section 14 may be implemented as thin on the intake side of the calibration unit and cooled by the adjoining longitudinal section, which is indicated in FIG. 8 with a dot-dash line and is provided with its own cooling, as shown in FIG. 4.

What is claimed is:

1. A device for calibrating an extruded plastic profile having a calibration unit for the profiled strand coming-out of a molding profile nozzle, the calibration unit having a molding body, which encloses the profiled strand, having calibration surfaces pressing against the profiled strand and vacuum slots, which run in the calibration surfaces transversely to the passage direction of the profiled strand and are connectable to a partial vacuum source, wherein at least individual vacuum slots penetrate the molding body transversely to the passage direction and are closed off on an outside of the molding body in an airtight manner using a removable cover, wherein the vacuum slots can be connected with a vacuum source by way of vacuum channels provided in the molding body, and wherein removal of the cover allows the vacuum slots to be cleaned without disassembling the calibration unit or interrupting production of the plastic profile.

2. The device according to claim 1, wherein the at least individual vacuum slots penetrate the molding body transversely to the longitudinal direction of their discharge opening lying in the calibration surfaces.

3. The device according to claim 1, wherein the at least individual vacuum slots (6) penetrate the molding body (1) in the longitudinal direction of their discharge opening (7) lying in the calibration surfaces (5).

4. The device according to claim 1, wherein the vacuum slots (6) are expanded transversely to the slot width adjoining their discharge opening (7).

5. The device according to claim 4, wherein the vacuum slots (6) form a guide shoulder (9) for a cleaning tool (10) through the expansion (8).

6. The device according to claim 1, wherein the molding body (1) is subdivided into longitudinal sections (14), between which the vacuum slots (6) are formed, transversely to the passage direction (2).

7. The device according to claim 6, wherein vacuum slots (6) are formed by depressions in the front face (15) of one of two abutting longitudinal sections (14), the adjoining level front face (16) of the particular other section covering the depressions.

8. The device according to claim 6, wherein the intake-side longitudinal section (14) has a calibration surface shape differing from the shape of the calibration surfaces (5) of the remaining longitudinal sections (14).

9. The device according to claim 6, wherein the longitudinal sections (14) have through holes, which run in the passage direction (2) and are closed in both sides, in the area of the calibration surfaces (5) to form cooling ducts (17), which are connected via connection holes (18) to shared intake and outlet holes (19,20), which penetrate the longitudinal sections (14) in the passage direction (2) outside the area of the vacuum slots (6).

10. The device according to claim 1, wherein the cover (12) of the vacuum slots (6) on outside of the molding body (1) comprises a flexible film.

11. The device according to claim 10, wherein the film extending over multiple vacuum slots (6) around a circumference of the molding body (1) is used as a cover (12), which has notches (13) originating from one edge and extending between the vacuum slots (6).

12. The device according to claim 10, wherein the film of the cover (12) is magnetic in at least some area.

13. The device according to claim 8, wherein the outlet-side longitudinal section (14) also has a calibration surface shape differing from the shape of the calibration surfaces (5) of the remaining longitudinal sections (14).

* * * * *